(12) United States Patent
Zhang

(10) Patent No.: US 8,068,410 B2
(45) Date of Patent: Nov. 29, 2011

(54) BIAS CORRECTION FOR SCRUBBING PROVIDERS

(75) Inventor: Shuping Zhang, Sudbury, MA (US)

(73) Assignee: iBasis, Inc., Burlington, MA (US)

( * ) Notice: Subject to any disclaimer, the term of this patent is extended or adjusted under 35 U.S.C. 154(b) by 163 days.

(21) Appl. No.: 12/394,829

(22) Filed: Feb. 27, 2009

(65) Prior Publication Data

US 2010/0220591 A1  Sep. 2, 2010

(51) Int. Cl.
*H04L 12/26* (2006.01)
(52) U.S. Cl. ......... 370/216; 370/235; 370/252; 370/437
(58) Field of Classification Search .................. None
See application file for complete search history.

(56) References Cited

U.S. PATENT DOCUMENTS

| | | | |
|---|---|---|---|
| 5,343,465 A * | 8/1994 | Khalil | 370/232 |
| 6,201,954 B1 * | 3/2001 | Soliman | 455/226.2 |
| 6,684,061 B1 * | 1/2004 | Yost | 455/67.11 |
| 2004/0243503 A1 * | 12/2004 | Eng et al. | 705/37 |
| 2006/0098585 A1 * | 5/2006 | Singh et al. | 370/252 |
| 2006/0252376 A1 * | 11/2006 | Fok et al. | 455/67.13 |
| 2008/0102851 A1 | 5/2008 | Bodnar | |
| 2009/0285106 A1 * | 11/2009 | Bernard et al. | 370/242 |

OTHER PUBLICATIONS

Extended European Search Report for European Application No. 10154878.2; Date Mailed: May 27, 2010.
Di Sorte, D., "Minimum Price Inter-Domain Routing Algorithm," IEEE Communications Letters, IEEE Service Center, Piscataway, NJ, US, vol. 6, No. 4, Apr. 1, 2002, XP01106330.
Nakamura, M. et al., "A Pricing and Accounting Architecture for QoS Guaranteed Services on a Multi-Domain Network," 1999 IEEE Global Telecommunications Conference, Globecom '99, Seamless Interconnection for Universal Services, Rio de Janeiro, Brazil, Dec. 5-9, 1999, New York, NY, vol. 3, Dec. 1, 1999, pp. 1984-1988, XP002945669.

* cited by examiner

*Primary Examiner* — Chi H. Pham
*Assistant Examiner* — Shick Hom
(74) *Attorney, Agent, or Firm* — Hamilton, Brook, Smith & Reynolds, P.C.

(57) ABSTRACT

A decision about provider quality based on a quality metric observed says little about the quality of the provider. Further, the decision may be biased by a variation in customer contributions to the quality metric observed or by a variation in a number of completed calls received by a provider. Accordingly, a method and corresponding apparatus are provided to evaluate quality and to correct bias by determining a standard that accounts for at least one source of bias, comparing an observed measure of a provider against the standard to produce an evaluation of the observed measure of the provider, and affecting a decision about the quality of the provider based on the evaluation. As a result, an unbiased decision, for example, to scrub a provider can be made and in some instances, a provider may be rescued from being scrubbed.

29 Claims, 10 Drawing Sheets

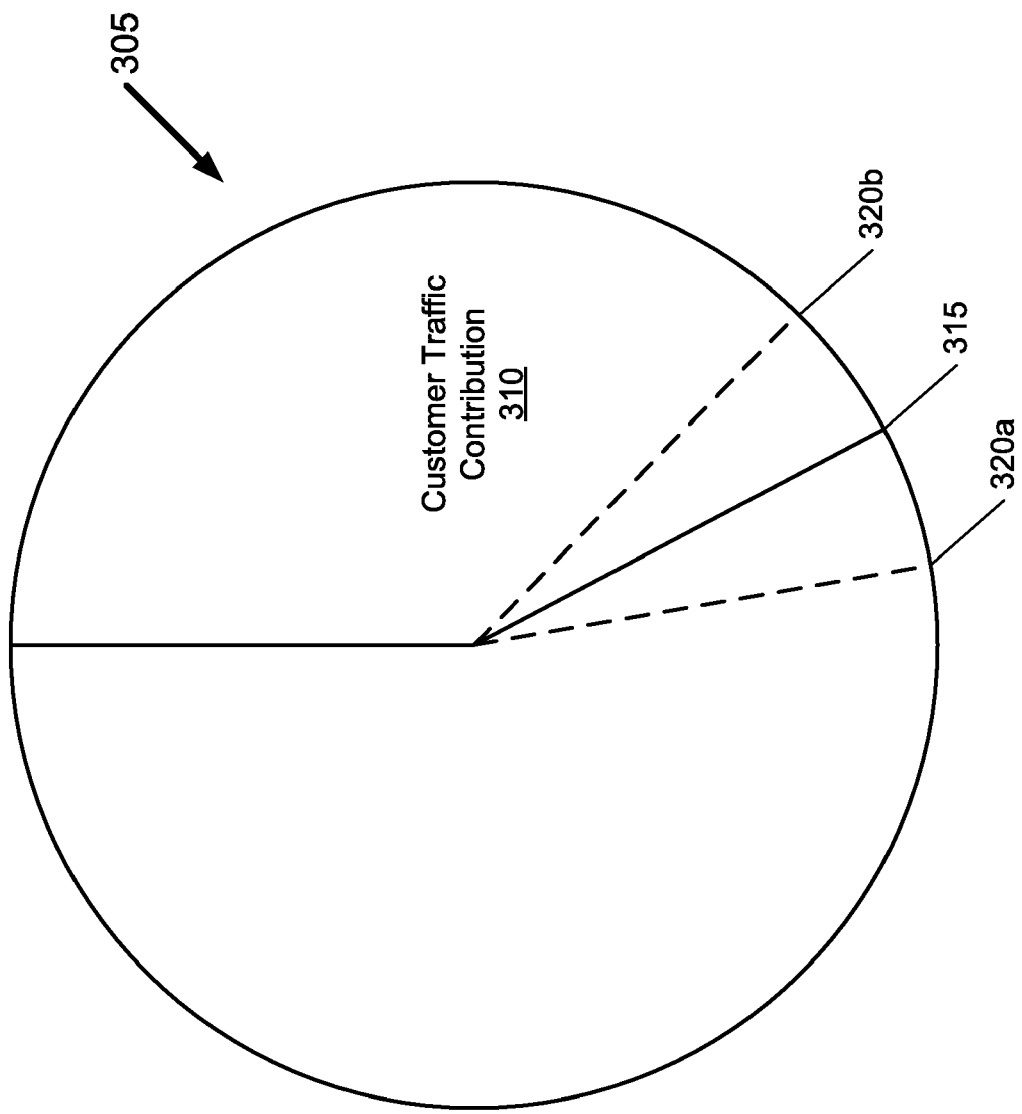

BIAS CORRECTION FOR SCRUBBING PROVIDERS

BACKGROUND

In Internet telephony, least cost routing is a process that provides customers with inexpensive telephone calls. Providers offering routes to destinations are selected, evaluated, and removed based on call quality to maintain a competitive cost base and acceptable call quality. The call quality of a route can vary considerably between providers. Call quality may be measured by quality metric, such as Answer-Seize Ratio (ASR) and Average Call Duration (ACD).

SUMMARY

An example embodiment of the present invention may be implemented in the form of a method or corresponding apparatus for evaluating quality. The method and corresponding apparatus according to one embodiment of the present invention includes determining a standard that accounts for at least one source of bias, comparing an observed measure of a provider against the standard as determined to produce an evaluation of the observed measure of the provider, and affecting a decision about the quality of the provider based on the evaluation.

Another embodiment determines the standard by accounting for a bias caused by a variation in customer contributions to the observed measure of the provider and affects the decision about the quality of the provider by scrubbing the provider from a routing lineup of providers based on the evaluation.

Yet another embodiment affects the decision, given a provider identified to be scrubbed, by rescuing the provider from being scrubbed based on the evaluation.

Still yet another embodiment determines the standard by accounting for a customer ticket bias caused by a variation in customer tickets received by a provider and affects the decision about the quality of the provider by declaring the problem reported by the customer tickets is a severe problem in the provider's network based on the evaluation.

A further embodiment determines the standard by accounting for a sample size bias caused by a variation in a number of completed calls received by the provider and affects the decision about the quality of the provider by scrubbing the provider from a routing lineup of providers based on the evaluation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a chart of a customer traffic bias being corrected, in accordance with an example embodiment of the present invention;

DETAILED DESCRIPTION

A description of example embodiments of the invention follows.

Where there are multiple destination carriers (or providers) capable of completing a call from a customer to a destination, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between a system operator, such as a wholesaler, and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

IBASIS, a system operator, is one of the largest carriers of international voice traffic in the world. In addition to global voice termination, IBASIS provides innovative mobile data services and prepaid calling services. Through its innovative quality routing and quality management technologies, IBASIS is able to select the best available route for every call. IBASIS Network Operations Centers (NOCs) combine state-of-the-art network management technology with around-the-clock dedicated technicians to ensure the highest quality of service to customers worldwide.

Figure 1:
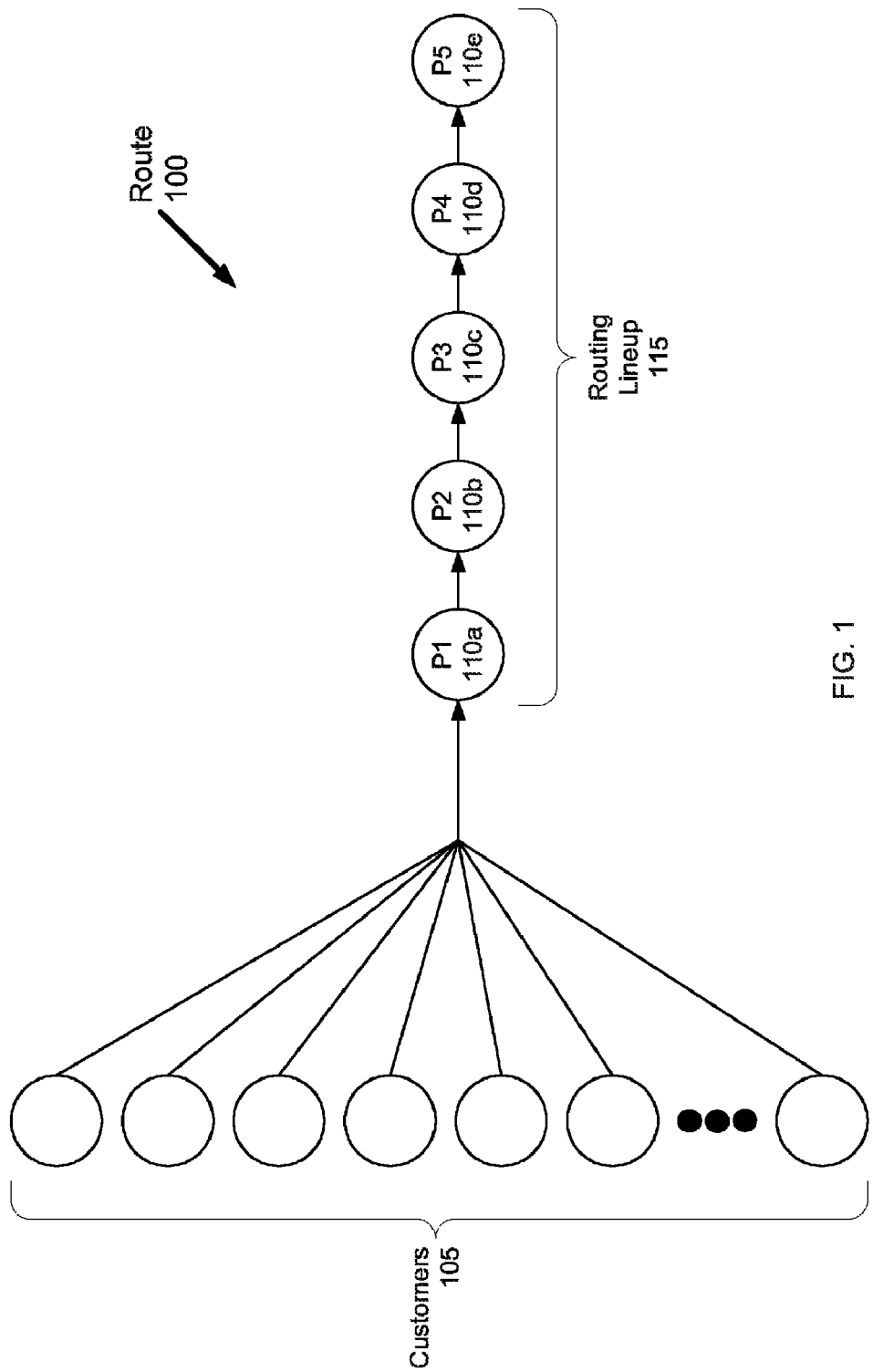
FIG. 1 is a network diagram of an example network in which embodiments of the present invention may be employed.

FIG. 1 illustrates a route 100 between customers 105 and a destination. The route 100 to the destination is provided by providers P1 through P5, 110*a* . . . 110*e*, respectively, of a routing lineup 115. The customers 105 may be offering voice, data, or other traffic to the route 100. As FIG. 1 illustrates the provider P1 110*a* first attempts to provide the route 100 to the customers 105. If the provider P1 110*a* is not able to do so (e.g., a provider is at capacity and cannot provide for an additional customer), the provider P2 110*b* then attempts to provide the route 100 to the customers 105, and so on, through the routing lineup 115.

An entity, such as a wholesaler, may manage the route 100 between the customers 105 and the destination. In particular, the entity may measure or receive a measure of a quality metric of the route 100 and/or of the providers P1 through P5, 110*a* . . . 110*e*.The quality metric measured includes, for example, Answer-Seize Ratio (i.e., ASR=number of call attempts answered/number of call attempts, where the number of call attempts is a number of calls a business (or provider) chooses to handle and tries to terminate and the number of call attempts answered is a number of calls the business (or provider) chooses to handle and does terminate, the ASR is also referred to as a Call Completion Rate or Ratio) and Average Call Duration (i.e., ACD=duration of calls/number of completed calls, where the number of completed calls is a number of calls a business (or provider) is able to terminate and generate revenue, also referred to as "Connects"). Other quality metrics measured may include Decline-to-Offer Ratio (i.e., DTO=number of declined calls/number of offers, where the number of offers is a number of individual calls transmitted from business to business. i.e., from offerer to offeree, in the telecom wholesale industry, and the number of declined calls is a number of calls the offeree chooses not to handle and "declines" back to the offerer), Margin per Offer (i.e., MPO=total margin divided by total offers, where the margin is a difference between revenue and cost), and other quality metric measures that are a linear combination of two components.

The foregoing quality metric, more particularly components of the quality metric, may be related as follows: Offers=Attempts+Declines+Loops. Loops is a number of calls which a business (or offerer) offered to other business (or offerer) but now is being offered back to the offerer. Usually Loops is minimal, therefore, Offers roughly equals to Attempts+Declines.

Based on the quality metric measured, the entity may "scrub" or otherwise remove a provider from the routing lineup 115. For example, a provider may be scrubbed from the routing lineup 115 in an event a quality metric measured for the provider is at or below a threshold or standard. Such a technique for scrubbing a provider and others, however, do not consider the following sources of bias:

1) Providers are not compared fairly. Customer traffic received by different providers is different, sometimes very different. Customer traffic may come from different customers whose base traffic profiles are different, e.g., commercial contrasted with residential and wholesale contrasted with retail. Thus, even for two providers with substantial similar capabilities, capacities, and/or qualities, in reality, quality metrics measured or otherwise determined for each provider may be quite different from one another. Scrubbing or otherwise removing a provider from a routing lineup without considering customer traffic is not fair. Hereinafter, "customer traffic bias" refers to a source of bias that is caused by a variation in customer traffic received by providers.

2) Providers complete or otherwise receive different amounts or numbers of completed calls. Sometimes a quality metric is measured or otherwise determined over a relatively small number of completed calls or sample size, resulting in a quality metric that is not trustworthy. Hereinafter, "sample size bias" refers to a source of bias that is caused by a variation in number of calls completed or number of completed calls received by providers.

Figure 2:
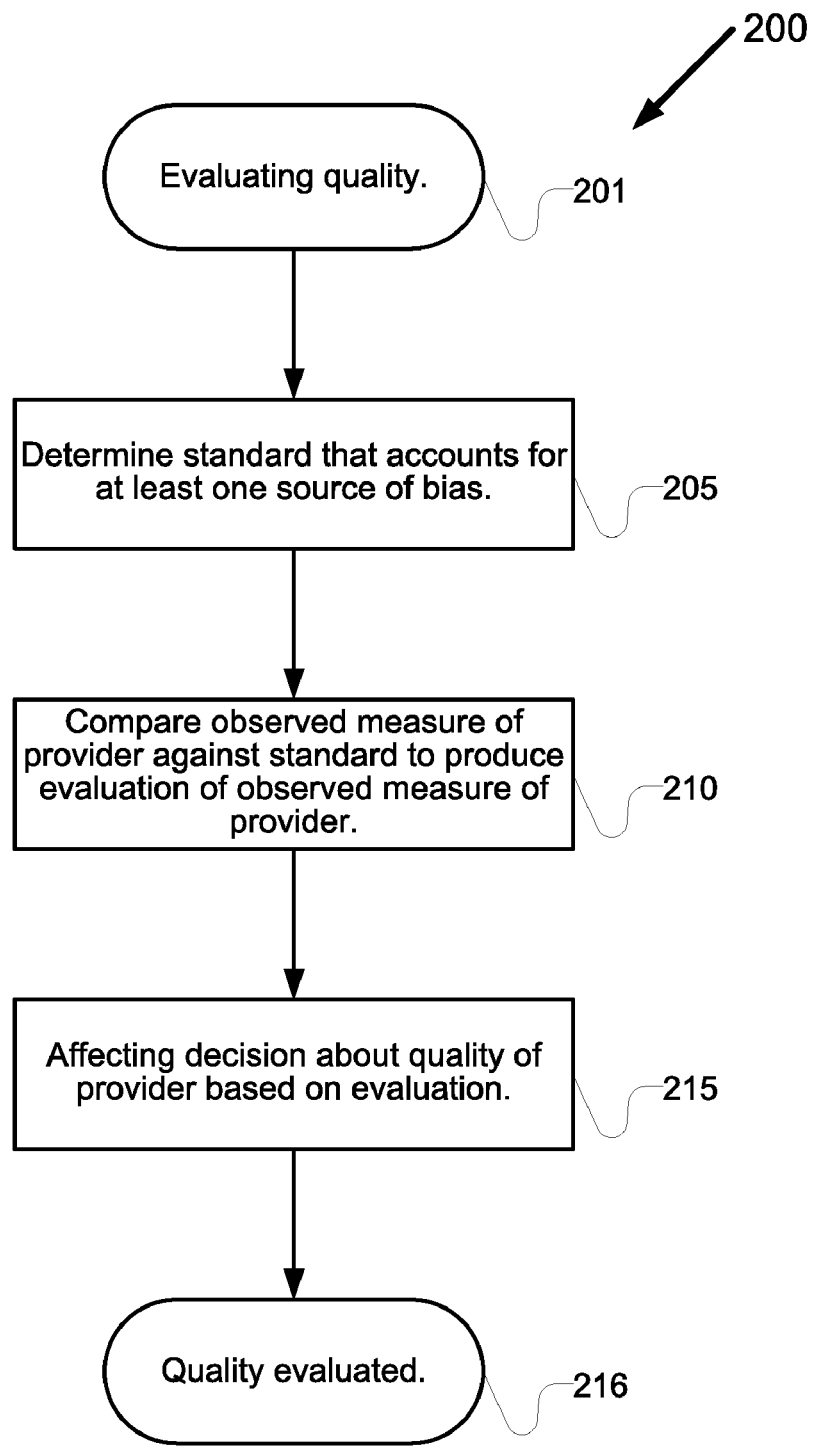
FIG. 2 is a flowchart of an example process for evaluating quality, in accordance with an example embodiment of the present invention.

FIG. 2 illustrates an example process 200 for evaluating quality. The process 200 starts (201). The process 200 determines (205) a standard that accounts for at least one source of bias. The process 200 compares (210) an observed measure of a provider against the standard as determined to produce an evaluation of the observed measure of the provider. The process 200 affects (215) a decision about the quality of the provider based on the evaluation. The process 200 ends (216).

Customer Traffic Bias Correction for Scrubbing a Provider

Customer traffic bias is caused by a variation in customer traffic received by a provider. Customer traffic bias may be explained by the following hypothetical ACD example with two customers C1 and C2, and two providers P1 and P2. All calls from C1 last 1 minute, while all calls from C2 last 9 minutes. P1 and P2 are assumed to have no differences in their intrinsic ACDs.

One can read the following table as: P1 completed 1000 calls from C1 and 100 calls from C2; and P2 completed 10 calls from C1 and 10 calls from C2.

|  | P | |
| --- | --- | --- |
| Completed: C | P1 | P2 |
| C1 | 1000 | 10 |
| C2 | 100 | 10 |

One can read the following table as: P1 completed 1000 minutes from C1 and 900 minutes from C2; and P2 completed 10 minutes from C1 and 90 minutes from C2

|  | P | |
| --- | --- | --- |
| Minutes: C | P1 | P2 |
| C1 | 1000 | 10 |
| C2 | 900 | 90 |

Determining a provider side ACD for P1 and P2 from their respective total completed minutes and their respective total number of completed calls, results in the following:

|  | P1 | P2 |
| --- | --- | --- |
| ACD: | 1900/1100 = 1.73 | 100/20 = 5 |

As is common industry practice, a decision is made that P2 is "better" than P1, because the provider side ACD for P2 is greater than the provider side ACD for P1, viz., 5 is greater than 1.73.However, judging provider quality by simply comparing ACDs of providers, or by comparing the ACD of a provider against a standard, which may be arbitrarily set, really does not say much about quality. What is a needed is a technique for evaluating quality.

Moreover, the decision that P2 is "better" than P1, simply because the provider side ACD for P2 is greater than the provider side ACD is biased because the decision does not identify or otherwise consider the influence of customer traffic on the comparison between the providers P1 and P2 on which the decision is based. Furthermore, the decision does not consider the providers P1 and P2 receiving different customer traffic from different customers C1 and C2. Customer traffic received from a customer may differ from other customer traffic received from other customers, for example, in terms of a quality metric measured and a number of completed calls, referred to collectively as a variation in customer traffic received by a provider. What is a further needed is a technique for accounting for (and thus correcting) bias.

In the hypothetical ACD example, P1 took 1000/(1000+100)=91% calls from C1 and 100/(1000+100)=9.1% calls from C2. The calls received from C1 having a client side ACD of (1000+10)/(1000+10)=1 and the calls received from C2 having a client side ACD of (900+90)/(100+10)=9. C1 may be, for example, a call-center customer who completes a large number of calls of short duration (e.g., telemarketers calling potential buyers) and C2 may be, for example, a residential customer who completes a small number of calls of long duration (e.g., family members calling one another).

A provider serves both the call-center customer and the residential customer, and customer traffic received from each customer (e.g., large number of completed calls of short duration and small number of completed calls of long duration) adds to or otherwise contributes to a quality metric measured for the provider. As such, in contrast to a biased decision, an unbiased decision accounts for a variation in customer traffic received by a provider. In particular, an unbiased decision accounts for such a variation by decomposing a provider side quality metric observed into terms or components, each of which is a customer contribution (or customer traffic contribution) to the provider side quality metric observed. In doing so, a quality of a provider may then be judged by evaluating the decomposed components and may be judged without bias.

A customer traffic contribution to a provider side quality metric may be, by way of non-limiting example, an average quality metric measured or otherwise achieved at a customer weighted by a percentage of completed calls received from that customer. A provider side quality metric may then be determined as a weighted average of quality metrics measured at each customer served by the provider. Continuing with the hypothetical ACD example, a provider side ACD for the provider P1 (ACD_P1) and a provider side ACD for the provider P2 (ACD_P2) may be decomposed as follows:

$$\begin{aligned} ACD\_P1 &= CompletedPercentage\_P1C1 * ACD\_P1C1 + \\ &\quad CompletedPercentage\_P1C2 * ACD\_P1C2 \\ &= 1000/1100*1000/1000 + 100/1100*900/100 \\ &= 91\%*1 + 9\%*9 \\ &= 1.73 \end{aligned}$$

$$\begin{aligned} ACD\_P2 &= CompletedPercentage\_P2C1 * ACD\_P2C1 + \\ &\quad CompletedPercentage\_P2C2 * ACD\_P2C2 \\ &= 10/20*10/10 + 10 20*90/10 \\ &= 50\%*1 + 50\%*9 \\ &= 5 \end{aligned}$$

Because of the above-described variation in customer traffic received by the provider (e.g., a difference in a number of completed calls), in order to correct for customer traffic bias, the ACDs achieved at each customer are weighted equally, e.g., fifty percent for each of the two customers as follows:

$$\begin{aligned} ACD\_P1\_BiasCorrected &= 50\%*ACD\_P1C1 + 50\%*ACD\_P1C2 \\ &= 50\%*1 + 50\%*9 \\ &= 5 \end{aligned}$$

$$\begin{aligned} ACD\_P2\_BiasCorrected &= 50\%*ACD\_P2C1 + 50\%*ACD\_P2C2 \\ &= 50\%*1 + 50\%*9 \\ &= 5 \end{aligned}$$

With the provider side ACDs decomposed into customer traffic contributions and customer traffic bias corrected for, an unbiased decision may be made that the provider P2 is not "better" than the provider P1, but rather both are of equivalent quality, i.e., the provider side ACD for the provider P2 (ACD_P2_BiasCorrected) and the provider side ACD for the provider P1 (ACD_P1_BiasCorrected) are equal.

As illustrated by the foregoing, contrary to common industry practice of simply judging or otherwise evaluating quality by a quality metric, the innovative technique of decomposing a quality metric into customer contributions does evaluate quality. Further, the innovative technique does correct for bias. Adopting this innovative technique may have an impact on the industry. For example, when trading phone minutes, simply considering ACD is insufficient, instead the ACD is decomposed into customer contributions which are then evaluated.

FIG. 3 illustrates customer traffic bias being corrected for by an embodiment of the present invention. As discussed above, affecting a decision about the quality of a provider, such as scrubbing the provider from a routing lineup of providers is biased when made: i) without identifying the influence or importance of customer traffic on the outcome of a comparison on which the affected decision to scrub is based; ii) without considering a variation in the customer traffic received by the provider; and iii) without accounting for this variation with a customer traffic contribution to the observed quality metric for the provider.

To affect or otherwise make an unbiased decision about the quality of the provider, the embodiment, given a minimum quality metric of a route 305, determines a customer traffic contribution 310 to the minimum quality metric of the route. The embodiment then sets a standard 315 as a function of the customer traffic contribution 310 to the minimum quality metric of the route.

The standard 315 represents a value at or above which a decision about the quality of the provider (or an outcome of a comparison) is due to customer traffic. In this embodiment, if an observed quality metric for a provider is at or above the standard 315, then the observed quality metric for the provider is less than the minimum quality metric of the route 305 (i.e., the outcome of the comparison) because of customer traffic. In other words, the provider received an amount of "bad" customer traffic, such as a large number of low ACD calls, sufficient enough to cause the observed quality metric for the provider to be lower than the minimum quality metric of the route 305. In this instance, affecting a decision about the quality of the provider, such as scrubbing or removing the provider from a routing lineup, is not fair, because the provider would not be scrubbed but for receiving the "bad" customer traffic.

The standard 315 further represents a value below which a decision about the quality of the provider (or an outcome of a comparison) is not due to customer traffic. In this embodiment, if an observed quality metric for a provider is below the standard 315, then the observed quality metric for the provider is less than the minimum quality metric of the route 305 not because of customer traffic, but because of, for example, the provider. In other words, the provider did not receive an amount of "bad" customer traffic sufficient enough to cause the observed quality metric for the provider to be lower than the minimum quality metric of the route 305. In this instance, affecting a decision about the quality of the provider, such as scrubbing or removing the provider from a routing lineup, is fair.

With the standard 315 set, the embodiment compares an observed quality metric for the provider against the standard 315 to produce an evaluation of the observed quality metric for the provider. In an event, the evaluation is that the observed quality metric is greater than the standard 315 (denoted by a dashed line 320a), than the embodiment affects a decision about the quality of a provider, such as not to scrub a provider. The observed quality metric for the provider is less then the minimum quality metric of the route 305 because of "bad" customer traffic and not because of the provider. Contrastingly, in an event, the evaluation is that the observed quality metric is less than the standard 315 (denoted by a dashed line 320b), than the embodiment affects a decision about the quality of a provider, such as to scrub the provider. The observed quality metric for the provider is less then the minimum quality metric of the route 305 not because of "bad" customer traffic.

In the foregoing embodiment, the customer traffic contribution 310 to the minimum quality metric of the route, as determined, may each be from one or more customers.

A convenient embodiment, given a plurality of customers served by a provider, clusters the plurality of customers into a first cluster of customers and at least one second cluster of customers. The first cluster of customers has a first quality metric. The at least one second cluster of customers has a second quality metric greater than the first quality metric.

For this embodiment, a customer traffic contribution to the minimum quality metric of the route is a function of a percent contribution of customer traffic that is sufficient to cause an overall route level quality metric to be lower than a given minimum quality metric of a route, and the first quality metric. The embodiment sets a standard to the percent contribution of customer traffic that is sufficient to cause the overall route level quality metric to be lower than the given minimum quality metric of the route.

The embodiment then compares an observed percentage of completed calls received by the provider from the first cluster of customers against the standard. In an event, the observed percentage of completed calls received by the provider from the first cluster of customers is lower than the standard; the embodiment scrubs or removes the provider for a routing lineup of providers.

Figure 4A:
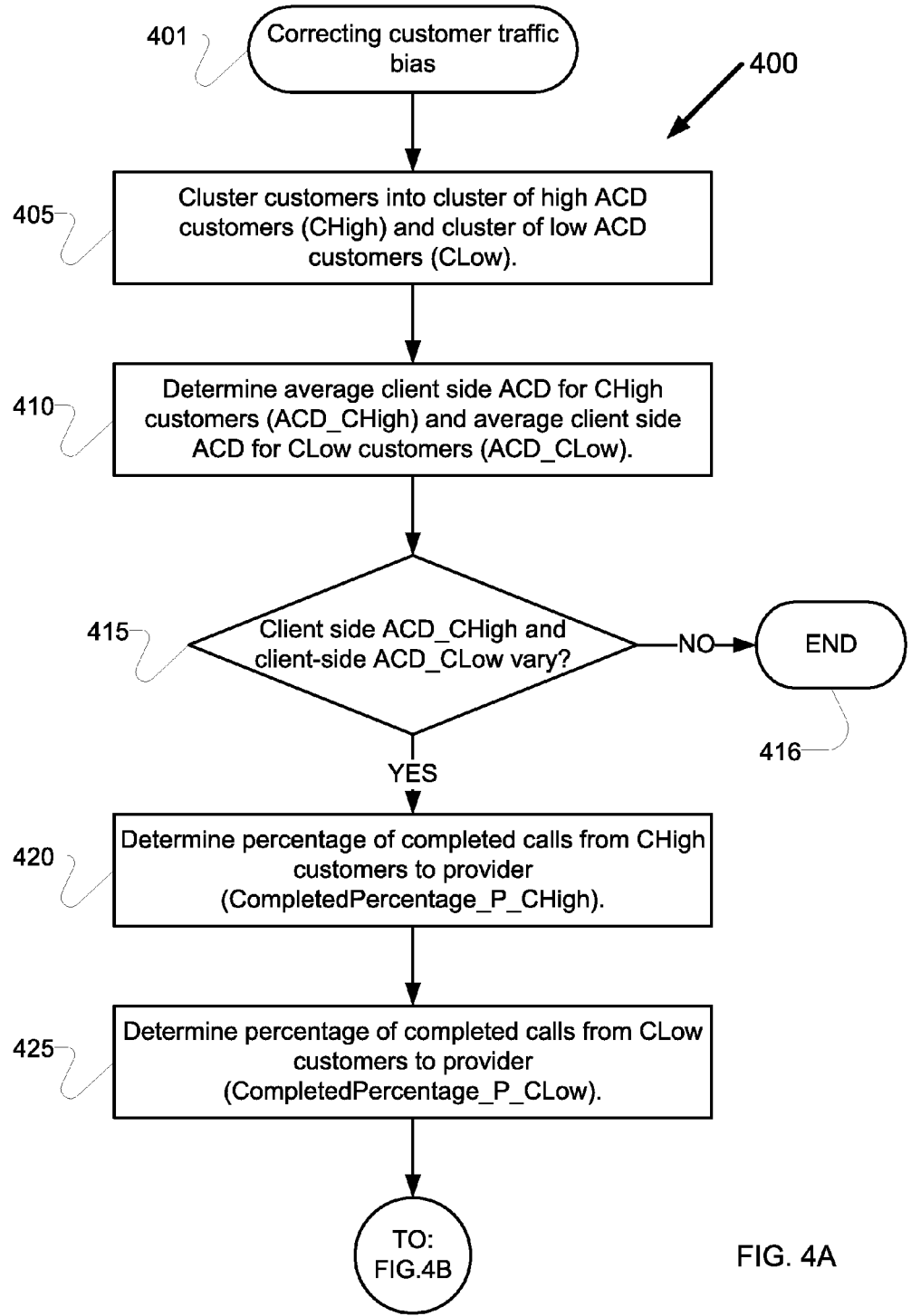
FIGS. 4A-4B are flowcharts of an example process for correcting customer traffic bias, in accordance with an embodiment of the present invention.

FIG. 4A illustrates an example process 400 for correcting a customer traffic bias for scrubbing or otherwise removing a provider from a routing lineup. For illustration purpose, the process 400 is described in the context of Average Call Duration (ACD) quality metric. But it should be readily apparent that the following description also applies to other quality metrics that are linear combinations of two components, such as Answer-Seize Ratio (ASR), Decline-to-Offer Ratio (DTO), and margin.

The process 400 starts (401). The process 400, given a minimum quality metric of a route, the route being provided by the provider between customers and a destination, clusters (405) the customers into a cluster of high ACD customers (CHigh) and a cluster of low ACD customers (CLow). The process 400 determines (410) an average client side ACD for the CHigh customers (ACD_CHigh) and an average client side ACD for the CLow customers (ACD_CLow). The process 400 determines (415) whether the average client side ACD_CHigh and the average client-side ACD_CLow vary so as to indicate a variation in customer traffic received by the provider causing a customer traffic bias to be corrected.

In an event, the process 400 determines (415) that the average client side ACD_CHigh and the average client-side ACD_CLow does vary so as to indicate a variation in customer traffic received by the provider, the process 400 continues and also determines (420) a percentage of completed calls from the CHigh customers to the provider (CompletedPercentage_P_CHigh); else the process 400 ends (416). The process 400 determines (425) a percentage of completed calls from the CLow customers to the provider (CompletedPercentage_P_CLow).

Figure 4B:
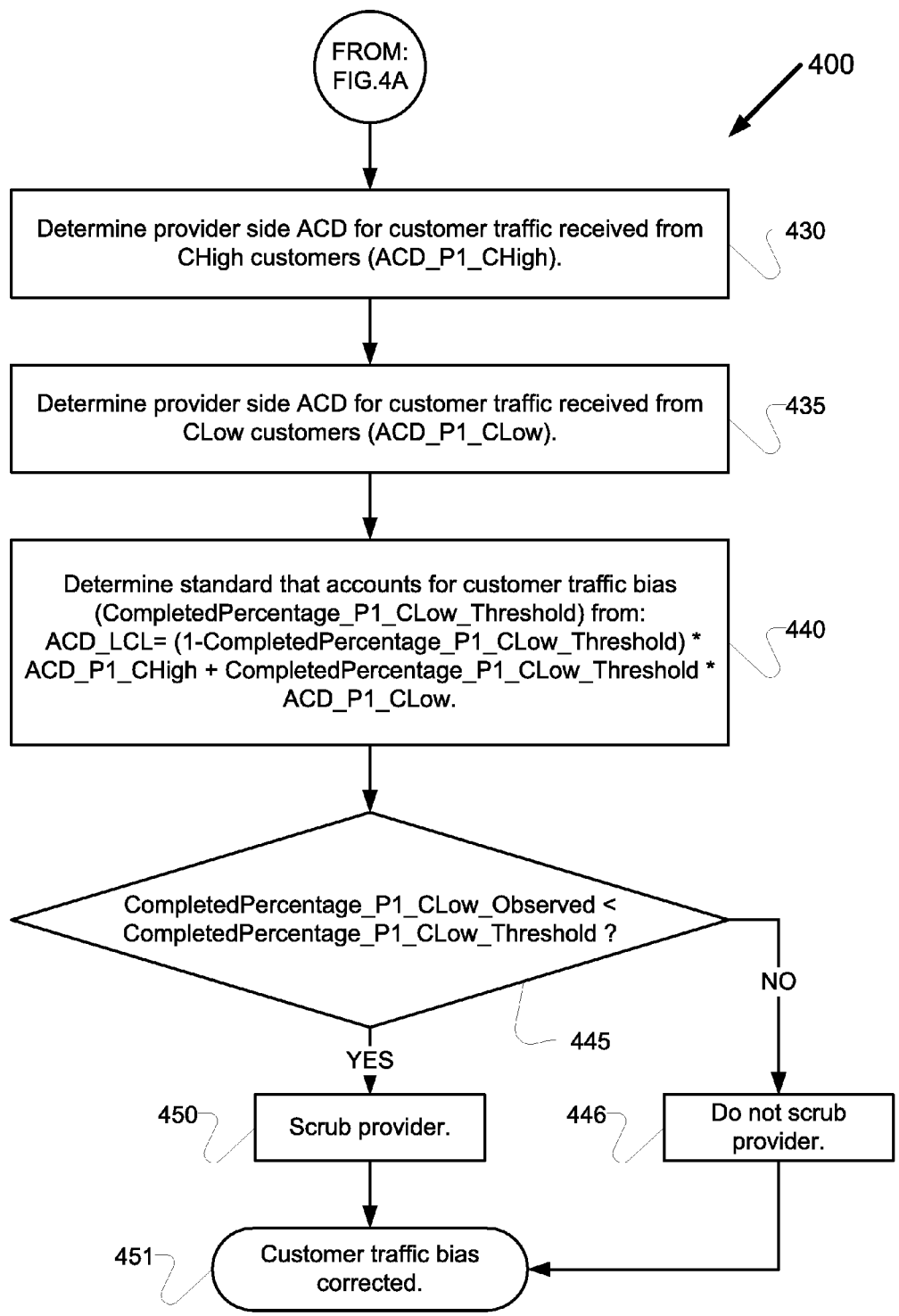

Continuing with FIG. 4B, the process 400 determines (430) a provider side ACD for customer traffic received from the CHigh customers (ACD_P1_CHigh) and determines (435) a provider side ACD for customer traffic received from the CLow customers (ACD_P1_CLow). The process 400 determines (440) a threshold or standard that accounts for customer traffic bias (CompletedPercentage_P1_CLow_Threshold) by decomposing the minimum quality metric of the route (ACD_LCL) as follows:

$$ACD\_LCL = (1-\text{CompletedPercentage\_P\_CLow\_Threshold}) * ACD\_P\_CHigh + \text{CompletedPercentage\_P\_CLow\_Threshold} * ACD\_P\_CLow$$

Described differently, the process 400 determines some portion of "bad" traffic (CompletedPercentage_P_CLow_Threshold), such as receiving a large number of low ACD calls, necessary or otherwise sufficient to bring an overall route level quality metric below a minimum quality metric of route (ACD_LCL in this example).

The process 400 compares (445) an observed measure of provider (CompletedPercentage_P1_CLow_Observered) against the CompletedPercentage_P1_CLow_Threshold standard. In an event, the process 400 compares (445) and the CompletedPercentage_P1_CLow_Observered is less than (or equal to) the CompletedPercentage_P1_CLow_Threshold standard, the process 400 scrubs (450) or otherwise removes the provider from a routing lineup. In an event, however, the process 400 compares (445) and the CompletedPercentage_P1_CLow_Observered is greater than (or equal to) the CompletedPercentage_P1_CLow_Threshold standard, the process 400 does not scrub (446) the provider from the routing lineup.

The process 400 ends (451) with the customer traffic bias corrected for scrubbing or otherwise removing the provider from the routing lineup.

The process 400 may be used to "rescue" a provider from being scrubbed. That is, given a provider with an observed quality metric less than a minimum quality metric of a route and thus, to be scrubbed, the process 400 performs the aforementioned to determine whether to scrub the provider or to rescue the provider from being scrubbed. In the context of rescuing a provider from being scrubbed (contrasted with scrubbing the provider), it may be convenient to identify or refer to the provider as a provider tentatively scrubbed, initially scrubbed, or a candidate provider.

Referring to the previous hypothetical ACD example to illustrate the foregoing rescue feature, the provider P1 completed 1000 calls from C1 and 100 calls from C2 for the provider side ACD of 1.73.

Recall, the provider side ACD for the provider P1 (ACD_P1) may be decomposed into customer traffic contributions as follows:

$$\begin{aligned}ACD\_P1 &= \text{CompletedPercentage\_P1}C1 * ACD\_P1C1 + \\ &\quad \text{CompletedPercentage\_P1}C2 * ACD\_P1C2 \\ &= 1000/1100 * 1000/1000 + 100/1100 * 900/100 \\ &= 91\% * 1 + 9\% * 9 \\ &= 1.73\end{aligned}$$

If a route level ACD minimum requirement (ACD_LCL) is 2, then without bias correction, the provider P1 is scrubbed because 1.73 is less than 2. This decision to scrub the provider P1, however, may be biased and result in the provider P1 being scrubbed for a routing line up unfairly.

An embodiment of the present invention rescues the provider P1 from being scrubbed by identifying or otherwise determining customer traffic bias and correcting the decision to scrub the provider P1 accordingly. The embodiment determines a contribution of customer traffic, specifically, a percent contribution of customer traffic (CompletedPercentage_P_CLow_Threshold) sufficient to cause the overall route level quality metric to be lower than the route level ACD minimum requirement (ACD_LCL=2) as follows:

$$ACD\_LCL=(1-CompletedPercentage\_P\_CLow\_Threshold)*ACD\_P\_CHigh+CompletedPercentage\_P\_CLow\_Threshold*ACD\_P\_CLow$$

$$2=(1-CompletedPercentage\_P\_CLow\_Threshold)*9+CompletedPercentage\_P\_CLow\_Threshold*1$$

CompletedPercentage_P_CLow_Threshold=0.875

The customer traffic received by the provider P1 resulted in customer traffic bias. In this example, 91% of the customer traffic received by the provider P1 was "bad" customer traffic, viz., customer traffic having a low ACD of 1 (compared with a high ACD of 9). This percentage or portion of "bad" customer traffic, however, was in excess of the contribution of customer traffic needed to cause the overall route level quality metric to be lower than the route level ACD minimum requirement, viz., 0.91>0.875. In other words, a decision about the quality of the provider (or an outcome of a comparison) is due to customer traffic. As such, an unbiased decision, that is, a decision corrected for customer traffic bias, is not to scrub the provider P1 as contrasted to the biased decision to scrub the provider P1 (i.e., the provider side ACD for the provider P1 is less then the route level ACD minimum requirement)

In reality, the problem of customer traffic bias is even worse than illustrated in the foregoing hypothetical example for the following reasons:

1) Distribution of customer calls to each provider is always different.
2) Individual calls have a very large duration variance. The foregoing hypothetical example assumes each call from C1 is 1 minute long and each call from C2 is 9 minute long. This assumption does not hold true in reality.
3) An ACD determined from less than 30 completed calls cannot be trusted.

As a result of the third reason, data relating to less than 30 completed calls are excluded, leaving a dataset as follows:

| Completed: C | P | |
| --- | --- | --- |
| | P1 | P2 |
| C1 | 1000 | — |
| C2 | 100 | — |

| Minutes: C | P | |
| --- | --- | --- |
| | P1 | P2 |
| C1 | 1000 | — |
| C2 | 900 | — |

Consequently, there is data for P1, but there no data for P2. In general, without a provider (e.g., P2) with which to compare P1, a decision to scrub P1 is very dangerous.

In many situations, however, data may look like the following. Assume P2 completed 30 calls from C2 in the example above and everything else is the same as the example above.

| Completed: C | P | |
| --- | --- | --- |
| | P1 | P2 |
| C1 | 1000 | — |
| C2 | 100 | 30 |

| Minutes: C | P | |
| --- | --- | --- |
| | P1 | P2 |
| C1 | 1000 | — |
| C2 | 900 | 270 |

A customer traffic bias can be easily seen by determining provider side ACD for P1 and P2 as follows:

$$ACD\_P1=1900/1100=1.73$$

$$ACD\_P2=270/30=9$$

In order to correct the customer traffic bias, estimate a missing value from C1 to P2. A best estimate is to use the same data from C1 to P1 resulting in the dataset as follows:

| Completed: C | P | |
| --- | --- | --- |
| | P1 | P2 |
| C1 | 1000 | 1000 |
| C2 | 100 | 30 |

| Minutes: C | P | |
| --- | --- | --- |
| | P1 | P2 |
| C1 | 1000 | 1000 |
| C2 | 900 | 270 |

And then determine the provider side ACD for P1 and P2 corrected for the customer traffic bias as follows:

$$ACD\_P1\_BiasCorrected = 50\% * ACD\_P1C1 + 50\% * ACD\_P1C2$$
$$= 50\% * 1 + 50\% * 9$$
$$= 5$$

$$ACD\_P2\_BiasCorrected = 50\% * ACD\_P2C1 + 50\% * ACD\_P2C2$$
$$= 50\% * 1 + 50\% * 9$$
$$= 5$$

Again, with customer traffic bias corrected for, an unbiased decision may be made that the provider P2 is not "better" than the provider P1, but rather both are of equivalent quality, viz., the provider side ACD for the provider P2 (ACD_P2_BiasCorrected) and the provider side ACD for the provider P1 (ACD_P1_BiasCorrected) are equal.

The concepts presented above may be applied to wide array of applications for evaluating service providers in customer service networks. The above-described evaluation of long-distance carriers in a telecommunications service network is but one example application. Other examples include evaluating bank tellers in a banking center, evaluating distribution service providers in a distribution network, evaluating service stations in a call center, and evaluating customer experience in a call center.

In further detail, consider a Network Operating (Operations) Center (NOC) controlling or otherwise evaluating problems reported by its customers in its network. A straight forward metric or measure would be to observe (e.g., over a period of time) a number of tickets of a certain problem type reported over a total number of tickets reported. This may be expressed as ticket proportion for problem type n TPn is equal to number of tickets for problem type n received Tn divided by total number of tickets received TT (i.e., TPn=Tn/TT).

The problem type n having the highest ticket proportion TPn is the most serious problem in the network. Further, if the ticket proportion TPn equals or exceeds a preset severity threshold or standard TPn_severity_threshold, then the problem type n is serious and something could be wrong, leading to an unstable quality. Simple comparisons, such as TPn>TP1, TP2 . . . TPm and TPn>TPn_severity_threshold without more, however, fail to identify the importance of a ticket with respect to a customer who reported the problem. For example, tickets are received from customers who differ from one another. Moreover, tickets received from different customers, such as large customers and small customers, are considered differently, even though a problem is experienced all customers.

The foregoing variation in tickets received is customer related and may be accounted for by decomposing the ticket proportion TPn into two or more terms, each term accounting for customer contribution to the ticket proportion TPn. For example, the ticket proportion TPn may be decomposed into a contribution of customer tickets from large customer(s) and a contribution of customer tickets from small customer(s) as follows:

$$TPn=(TnLarge+TnSmall)/(TTLarge+TTSmall),$$

which may be rewritten as:

$$TPn=(TTLarge/(TTLarge+TTSmall))*(TPnLarge/TTLarge)+(TTSmall/(TTLarge+TTSmall))*(TPnSmall/TTSmall); \text{ and}$$

$$TPn=TTLarge\_Percentage*TPnLarge+TTSmall\_Percentage*TPnSmall$$

Having decomposed the ticket proportion TPn, the contribution of customer tickets from large customer(s), such as TPnLarge, may be compared with the contribution from small customer(s), such as TPnSmall. A difference between the contribution from large customer(s) TPnLarge and the contribution from small customer(s) TPnSmall indicates a bias in the ticket proportion TPn. Further, if the contribution from large customer(s) TPnLarge significantly different from the contribution from small customer(s) TPnSmall, there is bias in the ticket proportion TPn that could lead to a biased decision to treat the problem type n as the most serious problem in the network that is unfair and may be inaccurate.

In this example, the foregoing bias caused by a variation in customer tickets received may be accounted for and thus, corrected by determining a contribution of customer tickets. Specifically, by determining a percent contribution of customer tickets TTSmall_Percentage_Threshold sufficient to cause the outcome of a comparison between the reported ticket proportion and the ticket proportion severity threshold to be the reported ticket proportion is greater than (or equal to) the ticket proportion severity threshold (i.e., TPn>TPn_severity_threshold) as follows:

$$TPn\_severity\_threshold=(1-TTSmall\_Percentage\_Threshold)*TPnLarge+TTSmall\_Percentage\_Threshold*TPnSmall$$

In an event, a percent contribution from small customer(s) TTSmall_Percentage is greater than (or equal to) the percent contribution of customer tickets TTSmall_Percentage_Threshold, it may be concluded that the ticket proportion for problem type n TPn is high due to the NOC receiving an greater amount of tickets of problem type n from small customer(s), who experienced problem type n much more than large customer(s).

To illustrate the foregoing, in a numeric example, suppose a NOC received 71 tickets for False Answer Supervision (FAS) over a one week period, with a total network ticket count of 100. If the NOC categorizes all other problem as non_FAS, then before the NOC declares FAS as the number one problem in its network (i.e., 71%>29%), the NOC would do the following:

Cluster its customers into a large customer cluster and a small customer cluster.

For each customer cluster, measure a FAS ticket proportion, for example:

TP_FAS_Large=1/10, i.e., for large customers, the NOC received 10 tickets total, 1 ticket of which is a FAS ticket; and TP_FAS_Small=70/90, i.e., for small customers, the NOC received 90 tickets total, 70 tickets of which are FAS tickets.

The NOC decomposes the FAS ticket proportion into two terms as follows:

$$TP\_FAS=TTLarge\_Percentage*TP\_FAS\_Large+TTSmall\_Percentage*TP\_FAS\_Small;$$

$$71=10/100*1/10+90/100*70/90$$

The NOC sets a FAS ticket proportion alarm or severity threshold of 50% of the total network tickets. That is, FAS is a severe problem in network in an event, the reported FAS ticket proportion TP_FAS is greater than the FAS ticket proportion severity threshold TP_FAS_severity_threshold. In this example, the FAS problem may be a severe problem in the network because the reported FAS ticket proportion TP_FAS is greater than the FAS ticket proportion (i.e., 71%>50%).

However before deciding that the FAS problem is a severe problem in the network, the NOC accounts and corrects for possible bias caused by a variation in customer tickets received. The NOC determines a percent contribution of FAS tickets from small customers TTSmall_Percentage_Threshold sufficient to cause the outcome of a comparison between the reported FAS ticket proportion and the FAS ticket proportion severity threshold to be the reported FAS ticket proportion is greater than the FAS ticket proportion severity threshold (i.e., TP_FAS>TP_FAS_severity_threshold) as follows:

$$TP\_FAS\_severity\_threshold=(1-TTSmall\_Percentage\_Threshold)*TP\_FAS\_Large+TTSmall\_Percentage\_Threshold*TP\_FAS\_Small;$$

$$50\%=(1-TTSmall\_Percentage\_Threshold)*1/10+TTSmall\_Percentage\_Threshold*70/90;$$

$$TTSmall\_Percentage\_Threshold=0.59$$

Because the contribution from small customer(s) TP_FAS_Small and the contribution from large customer(s) TP_FAS_Large is significantly different (i.e., 70/90>>1/10) and a percent contribution from small customer(s) TTSmall_Percentage is greater than the percent contribution of customer tickets TTSmall_Percentage_Threshold (i.e., 0.9>0.59), the NOC concludes it is the higher percentage of tickets from small customers, who are experiencing significantly high number of FAS problems, that causes the network FAS measure to be high. The FAS problem in the network is still normal, i.e., with the difference in FAS ticket proportion over large and small customers as big as 70/90 and 1/10, 59% of tickets over all network tickets from small customer is enough to bring the network FAS ticket proportion over the severity threshold of 50%.

Sample Size Bias Correction for Scrubbing a Provider

Samples size bias is caused by a variation in a number of completed calls received by a provider. Samples size bias may be explained by the following example.

Figure 5A:
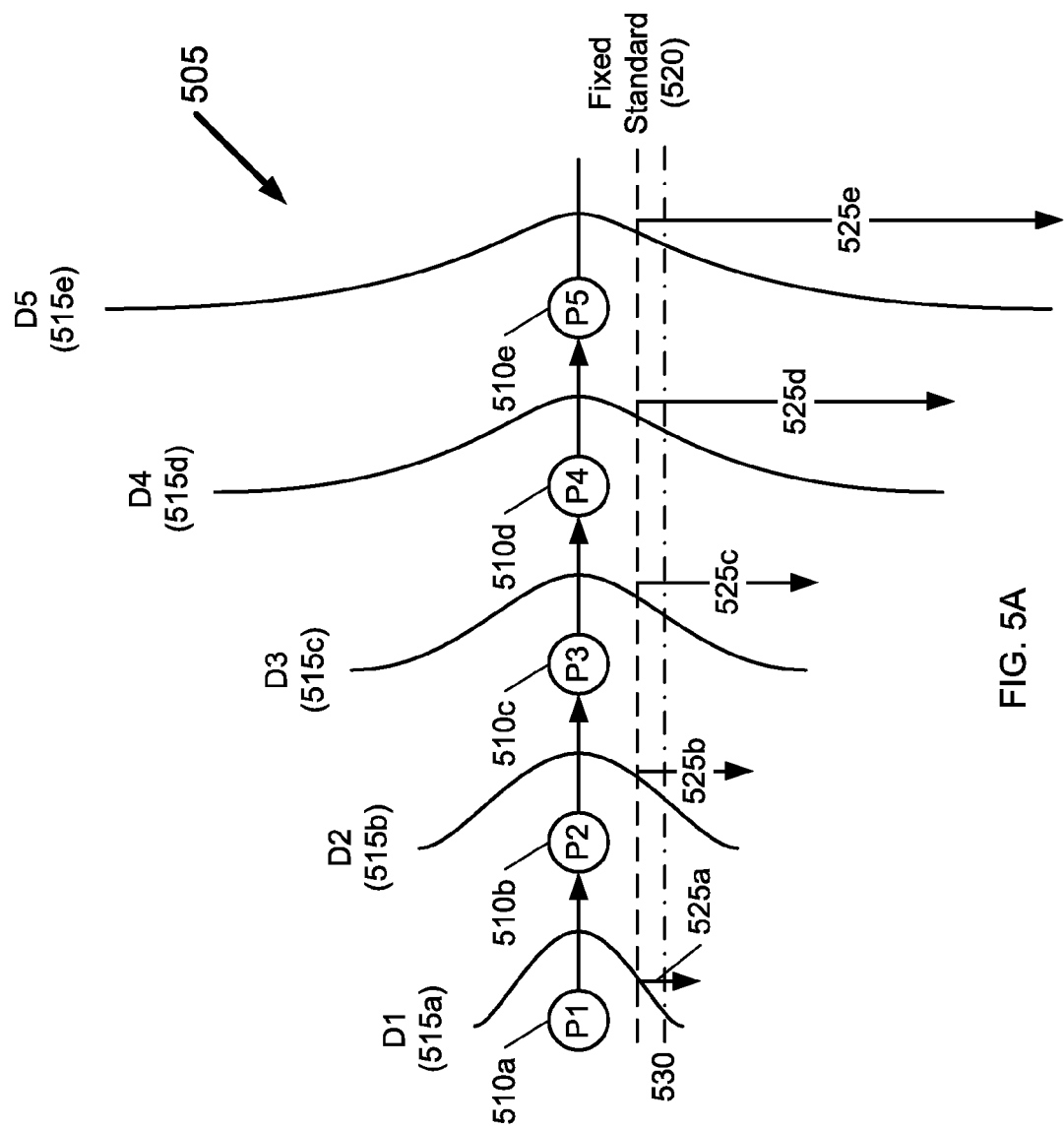
FIG. 5A is a block diagram of a sample size bias.

FIG. 5A illustrates a routing lineup 505 of providers P1 through P5, 510a . . . 510e, respectively. Positioned in the routing lineup 505, the provider P1 510a is at the "front" and the provider P5 510e is at the "back," with the providers P2 510b, P3 510c, and P4 510d therein between. Further, in the routing lineup 505, the provider P1 510a completes more calls (or receives more completed calls) than the provider P2 510b, the provider P2 510b completes more calls than the provider P3 510c, etc. As such, a sample size over which a quality metric is measured or otherwise determined for a provider at the front of a routing lineup is larger than another sample size for another provider at the back of the routing lineup.

Setting a standard over all the distributions of quality metrics D1 . . . D5, 515a . . . 515e, respectively, produces a fixed standard 520 resulting in portions of distribution or scrub portions 525a . . . 525e. A scrub portion is a distribution of quality metrics. A provider with a quality metric falling within a scrub portion is scrubbed. Setting the fixed standard 520 does not account for sample size bias caused by a variation in a number of completed calls received by a provider.

With the fixed standard 520, a scrub portion does not change proportionate to a change in a number of completed calls received by a provider. That is, a first change in sample size results in a scrub portion changing by a first amount. A second change in sample size equal to the first change results in a scrub portion changing by a second amount different from the first amount. An example of this non-proportionate change is a likelihood of a provider having a quality metric falling within a scrub portion, and thus, a likelihood of being scrubbed, increasing as a number of completed calls received by the provider decreases. Described differently, a likelihood of a provider having a quality metric that is less than a fixed standard increases as a number of completed calls received by the provider decreases.

Furthermore, with the fixed standard 520, the value to which with the fixed standard 520 is set does not change with a change in a number of completed calls received. For example, given the distribution D1 515a, a first provider with an observed quality metric 530 is scrubbed, because the observed quality metric 530, for example, falls within the scrub proportion 525a. Similarly, given the distribution D2 515b, a second provider also with the observed quality metric 530 is scrubbed, because the observed quality metric 530, for example, falls within the scrub proportion 525b. In fact, given any of the distributions D1 . . . D5, 515a . . . 515e, a provider with the observed quality metric 530 is scrubbed. Consequently, with a fixed standard, a provider may be scrubbed or otherwise removed from a routing lineup not because of bad quality, as evidenced by an observed quality metric less than or below the fixed standard, but because of the sample size bias.

Figure 5B:
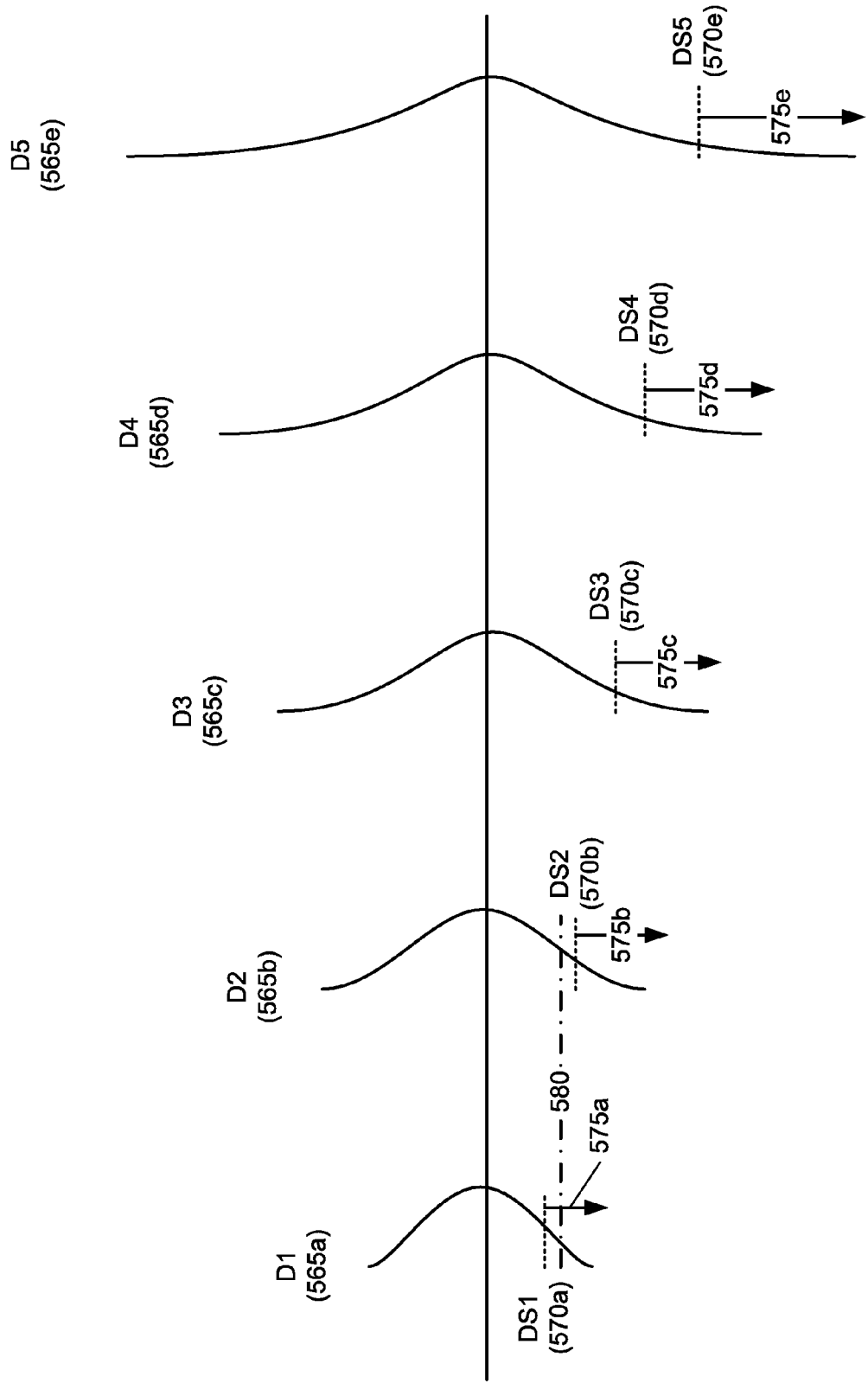
FIG. 5B is a block diagram of a sample size bias being corrected, in accordance with an example embodiment of the present invention.

FIG. 5B illustrates a sample size bias corrected for by an embodiment of the present invention. Distributions D1 through D5, 565a . . . 565e, respectively, are distributions of quality metrics measured over several ranges of number of completed calls. The distribution D1 565a is of quality metrics measured over a first range of number of completed calls. The distribution D2 565b is of quality metrics measured over a second range of number of completed calls, and so on.

As described above, a distribution of quality metrics varies depending on a number of completed calls or sample size. The first range of number of completed calls encompasses a number of completed calls greater than a number of completed calls encompassed by the second range of number of completed calls, and so on. That is, the distribution D1 565a is of quality metrics measured over a greater sample size than that of the distribution D2 565b, and, as such, the distribution D1 565a is narrower than the distribution D2 565b.

Given a distribution of quality metrics measured over a range of number of completed calls, an embodiment of the present invention sets a standard as a function of the distribution given. As the distribution changes with a number of completed calls or sample size, so too does the standard. It may be said that the embodiment sets a dynamic standard for a range of number of completed calls as contrasted with a fixed standard that does not change with sample size as described above in reference to FIG. 5A.

A convenient embodiment sets a dynamic standard to a value that divides a distribution into a scrub portion. For the distributions D1 through D5, 565a . . . 565e, dynamic standards DS1 through DS5, 570a . . . 570e, respectively, divide the distributions D1 through D5, 565a . . . 565e into scrub portions 575a . . . 575e, respectively. With a dynamic standard as described, there is a relationship between a distribution and a scrub portion, for example, the scrub portion is 5% of the distribution.

Further with the dynamic standard, the relationship between the distribution and the scrub portion is independent or otherwise unaffected by a number of completed calls or sample size. For example, with the dynamic standards DS1 570a and DS5 570e set, the scrub portion 575a and the scrub portion 575e are both 5% of the distribution D1 565a and the distribution D5 565e, respectively. This is true despite the distribution D1 565a being measured over a range of number of completed calls (e.g., greater than 1000 completed calls) and the distribution D5 565e being measured over another range of number of completed calls (e.g., 30 to 50 completed calls).

In contrast to the fixed standard 520 of FIG. 5A, with the dynamic standard dynamic standards DS1 through DS5, 570a . . . 570e, a scrub portion changes proportionate to a change number of completed calls received (or sample size). That is a likelihood of a provider having a quality metric falling within a scrub portion, and thus, a likelihood of being scrubbed, neither increases, nor decreases as a number of completed calls received by the provider changes. Described differently, a likelihood of a provider having a quality metric that is less than dynamic standards DS1 through DS5, 570a . . . 570e neither increases, nor decreases as a number of completed calls received by the provider changes.

While a relationship between a distribution and a scrub portion is unaffected by a number of completed calls, a value to which a dynamic standard is set changes as the distribution changes with sample size. For example, the value of the dynamic standard DS1 570a is not the same as the value of the dynamic standard DS5 570e. As such, it may be convenient to refer to a dynamic standard as being for or otherwise associated with a number or a range of number of completed calls.

Furthermore, as a distribution changes with sample size, a value to which a dynamic standard is set changes in a manner reflecting a change in tolerance for scrubbing a provider. That is, whether an observed quality metric for a provider is allowable (and thus the provider is not scrubbed) or not allowable (and thus the provider is scrubbed) depends on a sample size over which the observed quality metric is measured. For example, given the distribution D1 565a, a first provider with an observed quality metric 580 is scrubbed, because the observed quality metric 580, for example, falls within the scrub proportion 575. Contrastingly, given the distribution D2 565b, a second provider also with the observed quality metric 580 is not scrubbed, because the observed quality metric 580, for example, does not fall within the scrub proportion 575b. The reason for scrubbing the first provider and not the second provider being that first provider achieved the same observed quality metric 580 as the second provider, but after receiving a number of completed calls greater than a number of completed received by the second provider.

It may be said that embodiments of the present invention that account for sample size bias caused by a variation in a number of completed calls received by a provider are characterized by a tolerance for scrubbing the provider that changes with the number of completed calls received. Moreover, these embodiments may be contrasted with those techniques not characterized as such, for example, the ones described in reference to FIG. 5A.

The foregoing may be used to "rescue" a provider from being scrubbed. That is, a provider identified to scrubbed (e.g., having an observed quality metric at or below a threshold) may not be scrubbed when sample size bias is considered.

The foregoing may be further illustrated in the following example.

A convenient embodiment, given completed calls received "bucketized" into buckets (alternatively, the embodiment "bucketizes" the completed calls into buckets), compares observed quality measures that fall within a same bucket. For example, buckets having the following ranges of number completed calls received or sample sizes:

Bucket 1: Sample Size>=1000
Bucket 2: Sample Size from 300 to 1000
Bucket 3: Sample Size from 100 to 300
Bucket 4: Sample Size from 50 to 100
Bucket 5: Sample Size from 30 to 50

Quality metrics (e.g., ACD) measured or observed over, for example, a 30 day history, are assigned to the buckets as follows:

| Day | Provider | Completed | ACD | Completed Bucket |
|---|---|---|---|---|
| 1 | P1 | 200 | 4.2 | B3 |
| 1 | P2 | 32 | 4 | B5 |
| 2 | P2 | 300 | 4.4 | B3 |
| 2 | P3 | 49 | 1.3 | B5 |
| 3 | P2 | 270 | 4.8 | B3 |
| 3 | P3 | 33 | 2.7 | B5 |
| ... | ... | ... | ... | ... |
| 30 | P3 | 417 | 4.6 | B3 |
| 30 | P4 | 39 | 1.1 | B5 |

The embodiment, given the quality metric assigned to the bucket, sets a dynamic standard for a respective bucket (ACD_LCL for bucket) to a value at least one standard deviation from the mean of the respective bucket as follows:

$$ACD\_LCL \text{ for bucket} = \text{mean}(ACDs \text{ in bucket}) - 2*\text{standard deviation}(ACDs \text{ in bucket})$$

With the dynamic standard for each bucket set, the embodiment compares an observed quality measure observed over a number of completed calls received encompassed by or falling within a bucket against the dynamic standard associated with that bucket.

For example, for each of the providers P1 and P2, an observed quality metric (ACD) is observed over a number of completed calls received falling within a bucket (CompletedBucket) as follows:

| Day | Provider | Completed | ACD | Completed Bucket |
|---|---|---|---|---|
| 0 | P1 | 275 | 3.8 | B3 |
| 0 | P2 | 44 | 1.8 | B5 |

The embodiment scrubs or otherwise removes a provider from a routing lineup in an event; an observed measure for a provider (ACD) observed over a number of completed calls falling with a bucket (CompletedBucket) is less than a dynamic standard associated with that bucket (ACD_LCL) as follows:

For the provider P1, if 3.8<ACD_LCL_B3, then scrubbed the provider P1 for low ACD; else does not scrub the provider P1 (or rescue the provider P1 from being scrubbed).

For the provider P2, if 1.8<ACD_LCL_B5, then scrubbed the provider P2 for low ACD; else does not scrub the provider P1 (or rescue the provider P1 from being scrubbed).

As illustrated, sample size bias is accounted and corrected for by comparing an observed quality metric against a dynamic standard associated with a range of number of completed calls received encompassing the number of completed calls received. For example, for the provider P1, its quality metric ACD is compared against the dynamic standard ACD_LCL_B3 (not ACD_LCL_B5) because the quality metric was observed over a number of completed calls that falls within the bucket B3 (not the bucket B3). Furthermore, sample size bias is accounted and corrected for by not comparing an observed quality metric against a fixed standard (e.g., the fixed standard 520 of FIG. 5A).

For a bucket that has less than 10 observations during, for example, the 30 day history, it may be convenient to interpolate a dynamic standard from a known dynamic standard of a known bucket. For example, if the buckets B1, B2, B4 have less than 10 observations, dynamic standards for the buckets B1, B2, B4 may be interpolated from, for example, a dynamic standard for the bucket B3 as follows as:

ACD_LCL_B1=ACD_LCL_B3

ACD_LCL_B2=ACD_LCL_B3

ACD_LCL_B4=(ACD_LCL_B3+ACD_LCL_B5)/2

Figure 6A:
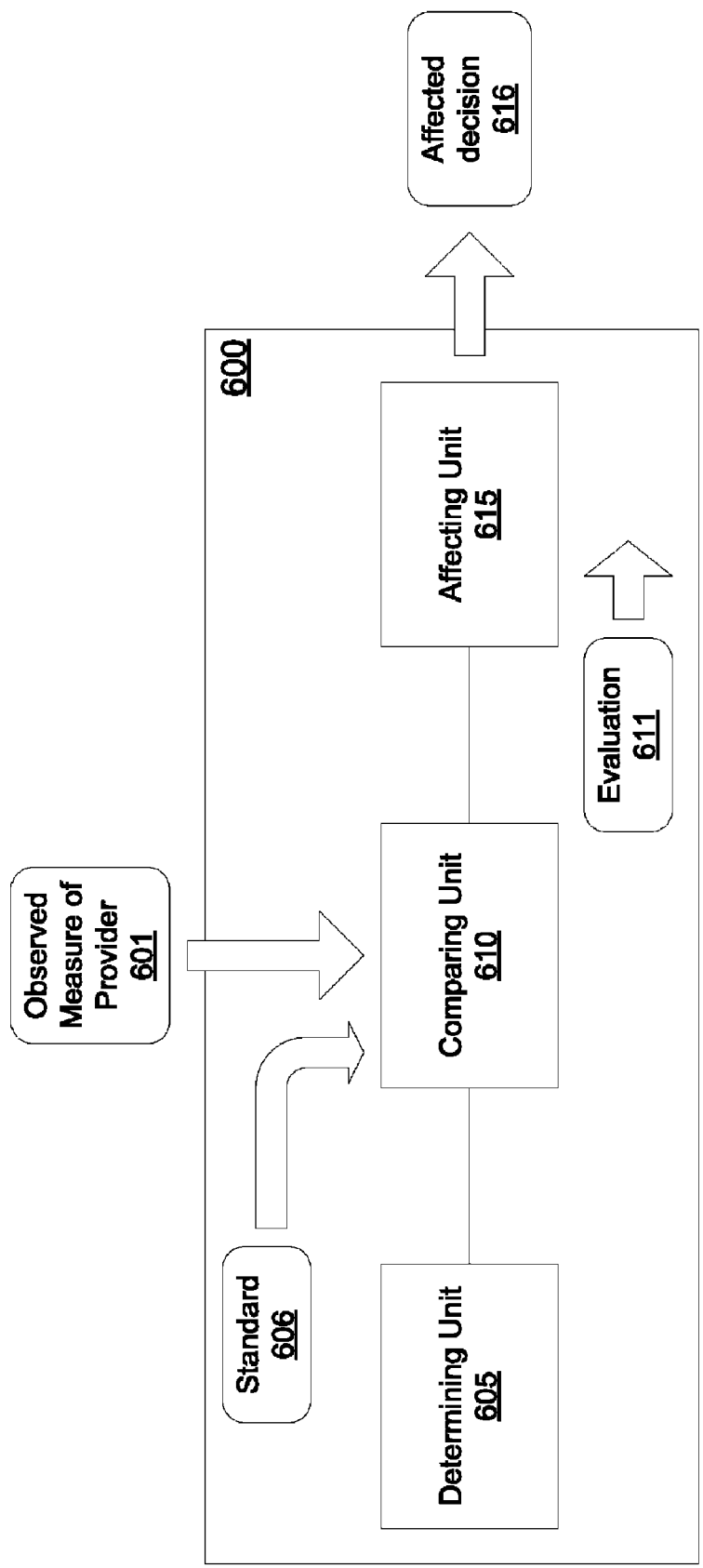
FIGS. 6A-6B are block diagrams of example apparatuses to evaluate quality, in accordance with an example embodiments of the present invention.

FIG. 6A illustrates an example apparatus 600 to evaluate quality. The apparatus 600 has a determining unit 605, comparing unit 610, and affecting unit 615. The determining unit 605 and the comparing unit 610 are communicatively coupled to each other, and the comparing unit 610 and the affecting unit 615 are communicatively coupled to each other.

The determining unit 605 determines a standard 606 that accounts for at least one source of bias. The comparing unit 610 compares an observed measure of a provider 601 against the standard 606, as determined, to produce an evaluation 611 of the observed measure of the provider. The affecting unit 615 affects a decision about the quality of the provider based on the evaluation 611, denoted in FIG. 6A as block labeled with reference number 616.

Figure 6B:
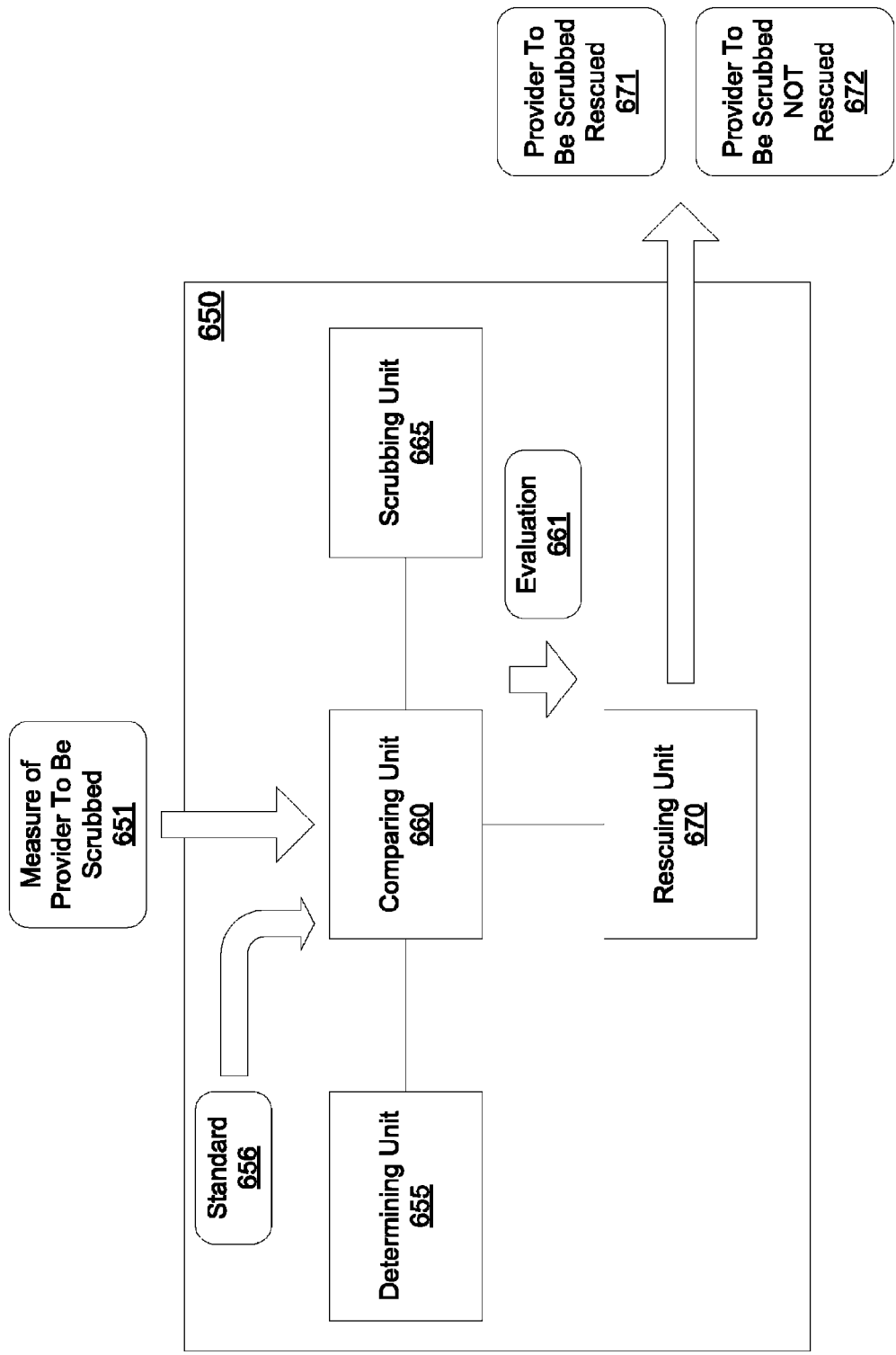

FIG. 6B illustrates another example apparatus 650 to correct bias for scrubbing a provider. The apparatus 650 has a determining unit 655, comparing unit 660, scrubbing unit 665, and rescuing unit 670. The determining unit 655 and the comparing unit 660 are communicatively coupled to each other, the comparing unit 660 and the scrubbing unit 665 are communicatively coupled to each other, and the comparing unit 660 and the rescuing unit 670 are communicatively coupled to each other.

The determining unit 655 determines a standard 656 that accounts for at least one source of bias. The comparing unit 660 compares a measure of a provider to be scrubbed 651 against the standard 656, as determined, to produce an evaluation 661. The rescuing unit 615 rescues the provider to be scrubbed from being scrubbed from a routing lineup based on the evaluation 661, denoted in FIG. 6B as blocks labeled with reference numbers 671 and 672.

Figure 7:
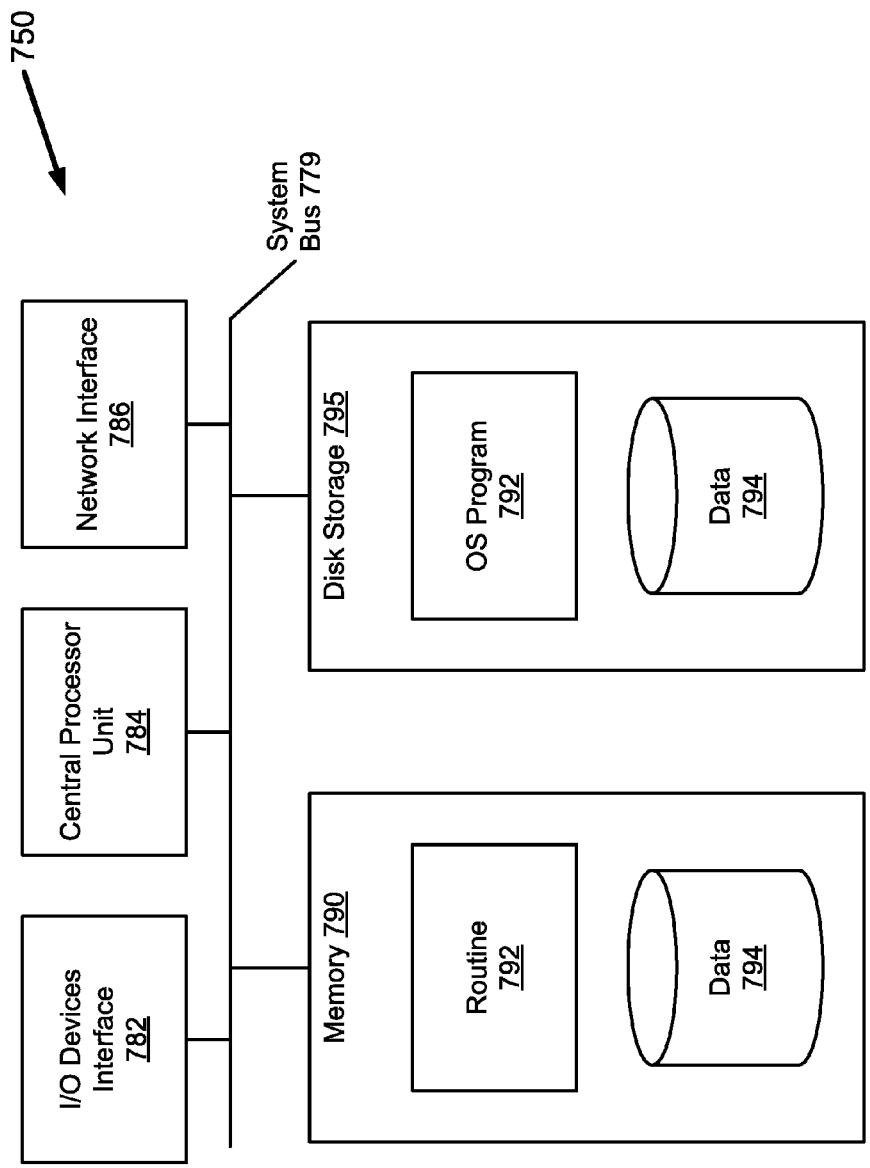
FIG. 7 is an example computer implementing embodiments of the present invention.

FIG. 7 is a block diagram of the internal structure of a computer 750 in which various embodiments of the present invention may be implemented. The computer 750 contains system bus 779, where a bus is a set of hardware lines used for data transfer among the components of a computer or processing system. Bus 779 is essentially a shared conduit that connects different elements of a computer system (e.g., processor, disk storage, memory, input/output ports, network ports, etc.) that enables the transfer of information between the elements. Attached to system bus 779 is I/O device interface 782 for connecting various input and output devices (e.g., keyboard, mouse, displays, printers, speakers, etc.) to the computer 750. Network interface 786 allows the computer 750 to connect to various other devices attached to a network. Memory 790 provides volatile storage for computer software instructions 792 and data 794 used to implement an embodiment of the present invention. Disk storage 795 provides non-volatile storage for computer software instructions 792 and data 794 used to implement an embodiment of the present invention. Central processor unit 784 is also attached to system bus 779 and provides for the execution of computer instructions.

In one embodiment, the processor routines 792 and data 794 are a computer program product (generally referenced 792), including a computer readable medium (e.g., a removable storage medium such as one or more DVD-ROM's, CD-ROM's, diskettes, tapes, etc.) that provides at least a portion of the software instructions for the invention system. Computer program product 792 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 7 is for purposes of illustration and not limitation of the present invention.

While this invention has been particularly shown and described with references to example embodiments thereof, it will be understood by those skilled in the art that various changes in form and details may be made therein without departing from the scope of the invention encompassed by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A computer-implemented method comprising:
   in a computer:
   accounting for at least one source of bias in a standard;
   comparing an observed measure of a provider against the standard to produce an evaluation of the observed measure of the provider;
   affecting a decision about the quality of the provider based on the evaluation; and
   wherein affecting the decision includes, given a to-be-scrubbed provider, rescuing the to-be-scrubbed provider from being scrubbed based on the evaluation taking into account the at least one source of bias.

2. The computer-implemented method of claim 1 wherein accounting includes accounting for a bias caused by a variation in customer contributions to the observed measure of the provider.

3. The computer-implemented method of claim 2 wherein accounting includes accounting for a customer traffic bias caused by a variation in customer traffic received by the provider.

4. The computer-implemented method of claim 3 wherein accounting includes
   given a minimum quality metric of a route provided by the provider between customers and a destination;
   decomposing the minimum quality metric of the route into a first customer traffic contribution and at least one second customer traffic contribution; and
   setting the standard as a function of the first customer traffic contribution to the minimum quality metric of the route.

5. The computer-implemented method of claim 4 wherein decomposing the minimum quality metric of the route includes
   given a plurality of customers served by the provider;
   clustering the plurality of customers into a first cluster of customers and at least one second cluster of customers, the first cluster of customers having a first quality metric, and the at least one second cluster of customers having a second quality metric greater than the first quality metric;
   wherein the first customer traffic contribution is a function of a percent contribution of customer traffic that is sufficient to cause an overall route level quality metric to be lower than the given minimum quality metric of the route, and the first quality metric;

wherein setting includes setting the standard to the percent contribution of customer traffic that is sufficient to cause the overall route level quality metric to be lower than the given minimum quality metric of the route;

wherein comparing includes comparing an observed percentage of completed calls received by the provider from the first cluster of customers against the standard; and wherein affecting the decision includes scrubbing the provider from a routing lineup of providers in an event, the observed percentage of completed calls received by the provider from the first cluster of customers is less than the standard.

6. The computer-implemented method of claim 2 wherein accounting includes accounting for a customer ticket bias caused by a variation in customer tickets received by the provider, the customer tickets being used to report a problem in the provider's network.

7. The computer-implemented method of claim 6 wherein accounting includes
given a ticket proportion severity threshold;
decomposing the ticket proportion severity threshold into a first customer ticket contribution and at least one second customer ticket contribution; and
setting the standard as a function of the first customer ticket contribution.

8. The computer-implemented method of claim 7 wherein decomposing the ticket proportion severity threshold includes
given a plurality of customers served by the provider;
clustering the plurality of customers into a first cluster of customers and at least one second cluster of customers, the first cluster of customers having a first ticket proportion, and the at least one second cluster of customers having a second ticket proportion less than the first ticket proportion;
wherein the first customer ticket contribution is a function of a percent contribution of customer tickets that is sufficient to cause an overall network level ticket proportion to be greater than the ticket proportion severity threshold, and the first ticket proportion;
wherein setting includes setting the standard to the percent contribution of customer ticket that is sufficient to cause the overall network level ticket proportion to be greater than the ticket proportion severity threshold;
wherein comparing includes comparing an observed percentage of customer tickets received by the provider from the first cluster of customers against the standard; and
wherein affecting the decision includes declaring the problem reported by the customer tickets is a severe problem in the provider's network in an event, the observed percentage of customer tickets received by the provider from the first cluster of customers is less than the standard.

9. The computer-implemented method of claim 1 wherein accounting includes accounting for a sample size bias caused by a variation in a number of completed calls received by the provider.

10. The computer-implemented method of claim 9 wherein accounting includes
given a distribution of quality metrics measured over a range of number completed calls received;
setting the standard as a function of the distribution to produce a dynamic standard for the range of number completed calls received;
wherein comparing includes comparing an observed quality metric observed over the range of number completed calls received against the dynamic standard for the range of number completed calls received; and
wherein affecting the decision includes scrubbing the provider from a routing lineup of providers in an event, the observed quality metric observed over the range of number completed calls received is less than the dynamic standard for the range of number completed calls received.

11. The computer-implemented method of claim 10 wherein setting includes setting the dynamic standard to a value that divides the distribution into a portion of the distribution and results in a relationship between the distribution and the portion of the distribution that is independent of a number of completed calls.

12. The computer-implemented method of claim 10 wherein setting includes setting the dynamic standard to a value at least one standard deviation from a mean of the distribution.

13. The computer-implemented method of claim 1 wherein the observed measure of the provider is based on one or a combination of answer seizure ratio (ASR) and average call duration (ACD).

14. The computer-implemented method of claim 1 further comprising:
identifying the to-be-scrubbed provider as having an observed quality metric less than a minimum quality metric of a route provided by the to-be-scrubbed provider between customers and a destination.

15. An apparatus comprising:
an accounting unit to account for at least one source of bias in a standard;
a comparing unit communicatively coupled to the accounting unit to compare an observed measure of a provider against the standard to produce an evaluation of the observed measure of the provider;
an affecting unit to affect a decision about the quality of the provider based on the evaluation; and
wherein the affecting unit includes, given an observed measure of a to-be-scrubbed provider, a rescuing unit communicatively coupled to the comparing unit to rescue the to-be-scrubbed provider from being scrubbed based on the evaluation taking into account the at least one source of bias.

16. The apparatus of claim 15 wherein the accounting unit is configured to account for a bias caused by a variation in customer contributions to the observed measure of the provider.

17. The apparatus of claim 16 wherein the accounting unit accounts for a customer traffic bias caused by a variation in customer traffic received by the provider.

18. The apparatus of claim 17 wherein the accounting unit includes
given a minimum quality metric of a route provided by the provider between customers and a destination;
a decomposing unit to decompose the minimum quality metric of the route into a first customer traffic contribution and at least one second customer traffic contribution; and
a setting unit communicatively coupled to the decomposing unit to set the standard as a function of the first customer traffic contribution to the minimum quality metric of the route.

19. The apparatus of claim 18 wherein the decomposing unit includes
given a plurality of customers served by the provider;
a clustering unit to cluster the plurality of customers into a first cluster of customers and at least one second cluster of customers, the first cluster of customers having a first quality metric, and the at least one second cluster of customers having a second quality metric greater than the first quality metric;

wherein the first customer traffic contribution is a function of a percent contribution of customer traffic that is sufficient to cause an overall route level quality metric to be lower than the given minimum quality metric of the route, and the first quality metric;

wherein the setting unit sets the standard to the percent contribution of customer traffic that is sufficient to cause the overall route level quality metric to be lower than the given minimum quality metric of the route;

wherein the comparing unit compares an observed percentage of completed calls received by the provider from the first cluster of customers against the standard; and wherein the affecting unit includes a scrubbing unit to scrub the provider from a routing lineup of providers in an event, the observed percentage of completed calls received by the provider from the first cluster of customers is less than the standard.

20. The apparatus of claim 16 wherein the accounting unit accounts for a customer ticket bias caused by a variation in customer tickets received by the provider, the customer tickets being used to report a problem in the provider's network.

21. The apparatus of claim 20 wherein accounting unit includes
given a ticket proportion severity threshold;
a decomposing unit to decompose the ticket proportion severity threshold into a first customer ticket contribution and at least one second customer ticket contribution; and
a setting unit communicatively coupled to the decomposing unit to set the standard as a function of the first customer ticket contribution.

22. The apparatus of claim 21 wherein the decomposing unit includes
given a plurality of customers served by the provider;
a clustering unit to cluster the plurality of customers into a first cluster of customers and at least one second cluster of customers, the first cluster of customers having a first ticket proportion, and the at least one second cluster of customers having a second ticket proportion less than the first quality metric;
wherein the first customer ticket contribution is a function of a percent contribution of customer tickets that is sufficient to cause an overall network level ticket proportion to be greater than the ticket proportion severity threshold, and the first ticket proportion;
wherein the setting unit sets the standard to the percent contribution of customer ticket that is sufficient to cause the overall network level ticket proportion to be greater than the ticket proportion severity threshold;
wherein the comparing unit compares an observed percentage of customer tickets received by the provider from the first cluster of customers against the standard; and wherein the affecting unit includes a declaring unit to declare the problem reported by the customer tickets is a severe problem in the provider's network in an event, the observed percentage of customer tickets received by the provider from the first cluster of customers is less than the standard.

23. The apparatus of claim 15 wherein the accounting unit is configured to account for a sample size bias caused by a variation in a number of completed calls received by the provider.

24. The apparatus of claim 23 wherein the accounting unit includes
given a distribution of quality metrics measured over a range of number completed calls received;
a setting unit to set the standard as a function of the distribution to produce a dynamic standard for the range of number completed calls received;
wherein the comparing unit compares an observed quality metric observed over the range of number completed calls received against the dynamic standard for the range of number completed calls received; and
wherein the affecting unit includes a scrubbing unit to scrub the provider in an event, the observed quality metric observed over the range of number completed calls received is less than the dynamic standard for the range of number completed calls received.

25. The apparatus of claim 24 wherein the setting unit sets the dynamic standard to a value that divides the distribution into a portion of the distribution and results in a relationship between the distribution and the portion of the distribution that is independent of a number of completed calls.

26. The apparatus of claim 24 wherein the setting unit sets the dynamic standard to a value at least one standard deviation from a mean of the distribution.

27. The apparatus of claim 15 wherein the observed measure of the provider is based on one or a combination of answer seizure ratio (ASR) and average call duration (ACD).

28. The apparatus of claim 15 further comprising:
an identifying unit communicatively coupled to the comparing unit to identify the to-be-scrubbed provider as having an observed quality metric less than a minimum quality metric of a route provided by the provider between customers and a destination.

29. A computer program product comprising a non-transitory computer readable medium having a computer readable program, wherein the computer readable program when executed on a computer causes the computer to:
account for at least one source of bias in a standard;
compare an observed measure of a provider against the standard to produce an evaluation of the observed measure of the provider;
affect a decision about the quality of the provider based on the evaluation; and
given an observed measure of a to-be-scrubbed provider, rescue the to-be-scrubbed provider from being scrubbed based on the evaluation taking into account the at least one source of bias.

* * * * *